Nov. 23, 1948.   H. C. KAETKER   2,454,458
FISHING POLE HOLDER
Filed May 19, 1945   2 Sheets-Sheet 1
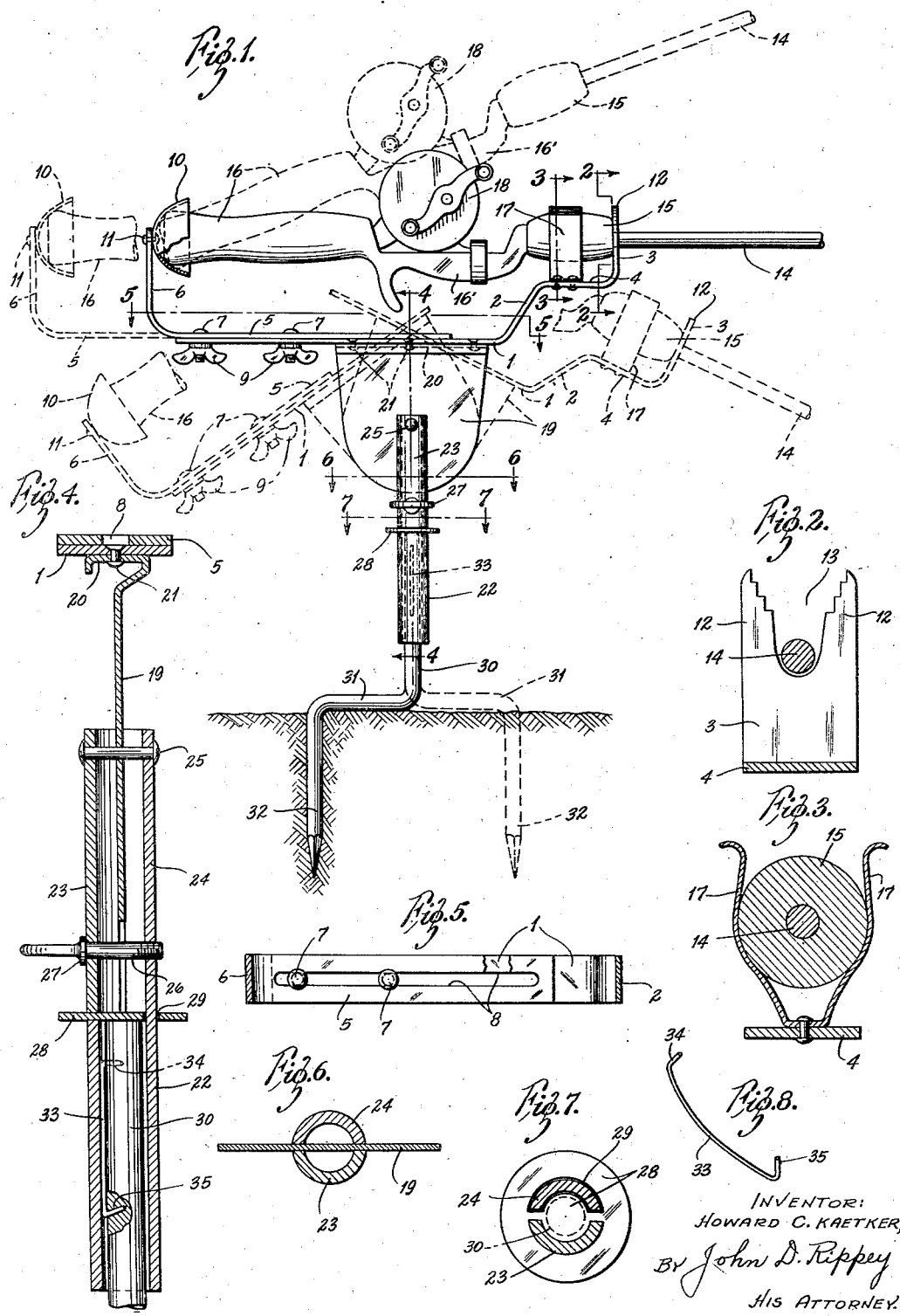
INVENTOR:
HOWARD C. KAETKER,
BY John D. Rippey
HIS ATTORNEY.

Nov. 23, 1948.   H. C. KAETKER   2,454,458
FISHING POLE HOLDER
Filed May 19, 1945   2 Sheets-Sheet 2
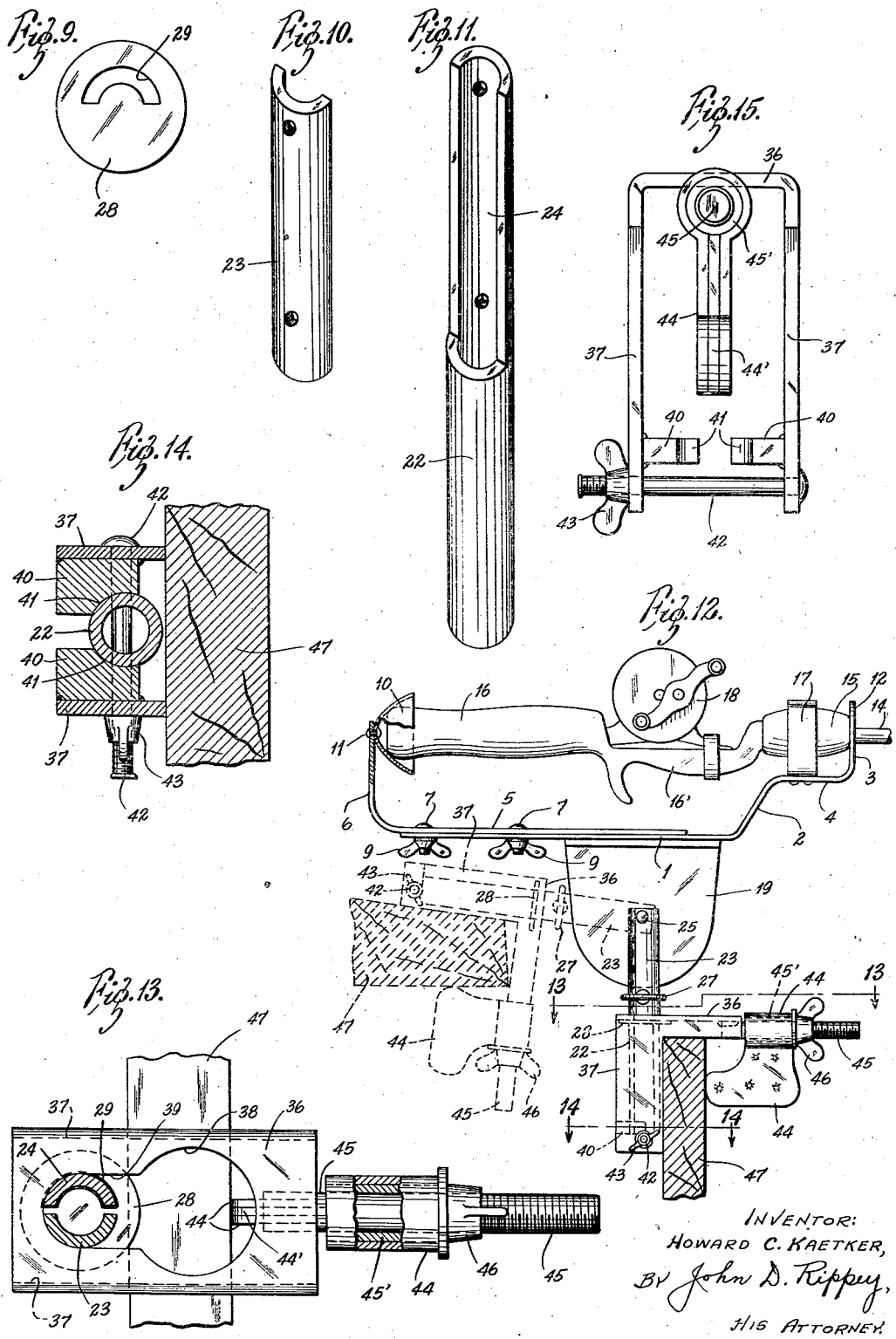
INVENTOR:
HOWARD C. KAETKER,
BY John D. Rippey,
HIS ATTORNEY.

Patented Nov. 23, 1948

2,454,458

UNITED STATES PATENT OFFICE 2,454,458

FISHING POLE HOLDER

Howard C. Kaetker, Cincinnati, Ohio

Application May 19, 1945, Serial No. 594,714

4 Claims. (Cl. 248—42)

This invention relates to a fishing pole holder; and it has special reference to a device for supporting and holding a fishing pole during its use, and means for attaching said device to the ground for swivel movements, or to other types of supports for such swivel movements, such as to boats, rafts, platforms, or stationary rails.

Objects of the invention are to provide an improved fishing pole holder having an adjusting bracket for engaging and holding the butt or handle ends of fishing poles of various sizes, and for supporting said ends of said poles in a manner to prevent binding, thereby leaving the poles freely and speedily removable from the bracket, as required for successful fishing and the setting of the hook or hooks; to provide a clamping device for holding said bracket adjusted at and to various selected lengths to engage and hold fishing poles having handle ends of different lengths; to provide a construction in said bracket whereby poles of various designs and diameters may be supported and held without damage or injury thereto or to the handles of said fishing poles; to provide a releasable spring device in connection with said bracket for grippingly engaging the handles of fishing poles without causing any damage or injury thereto, and without interfering with the free use or "snap" of the pole, and which will retain the pole in a set position regardless of whether the fishing pole reel is located directly above the pole or elsewhere, and regardless of whether the fishing pole is tilted or not; and to provide a fishing pole holder that is elastic and flexible in the sense that said holder may be adjusted to hold fishing poles of different types and sizes at different angles of inclination, without causing any damage or injury to the pole or to the pole handle, and without interfering with the "snap" or other manipulation of the fishing pole.

Numerous other objects and advantages of my improved fishing pole holder will be apparent from the following description, reference being made to the annexed drawings, in which—

Fig. 1 is a side elevation of a preferred modification of my improved fishing pole holder, showing said holder in dotted lines at different angles of inclination, and in swivel connection with a ground stake.

Fig. 2 is an enlarged cross-sectional view of one form and size of fishing pole and the supporting bracket therefor, on the line 2—2 of Fig. 1.

Fig. 3 is an enlarged sectional view on the line 3—3 of Fig. 1, showing a spring clamp device for resiliently gripping the fishing pole handle while leaving said handle freely detachable from the holder.

Fig. 4 is an enlarged sectional view on the line 4—4 of Fig. 1.

Fig. 5 is a sectional view on the line 5—5 of Fig. 1, showing the clamp devices by which the holder bracket can be securely held in different adjusted lengths.

Fig. 6 is an enlarged cross-sectional view on the line 6—6 of Fig. 1.

Fig. 7 is a similarly enlarged cross-sectional view on the line 7—7 of Fig. 1.

Fig. 8 is a perspective view of a spring element constituting a part of the fishing pole holder device shown in Fig. 1.

Fig. 9 is a plan view showing a washer element apart from the members with which it cooperates.

Fig. 10 is a perspective view showing a split tube section for engaging and holding the washer element of Fig. 9 in proper assembly.

Fig. 11 is a perspective view of the tube on which the washer element of Fig. 9 is mounted and is held by the tube section of Fig. 10.

Fig. 12 is a side elevation showing the fishing pole holder in swivel connection with a clamp for attaching said holder to a support such as a boat rail, raft, or the like, instead of a ground stake as shown in Fig. 1.

Fig. 13 is an enlarged sectional view on the line 13—13 of Fig. 12.

Fig. 14 is a similarly enlarged sectional view on the line 14—14 of Fig. 12.

Fig. 15 is an end elevation of the clamp device for supporting my improved fishing pole holder swiveled on a boat rail, raft rail, or other support, the nut for securing said clamp device being omitted.

My improved fishing pole holder comprises a bracket adapted to engage and hold the butt or handle end of a fishing pole of any known commercial type and to prevent unintentional detachment or displacement of said fishing pole regardless of the length of said butt or handle end, while leaving said fishing pole free for manipulation or for "snap" action. These features, elements and parts, assembled in a cooperative combination, provide a compact, flexible, practical and universal fishing pole holder for the attainment of all of the objectives herein stated.

In the preferred modification shown, said bracket comprises relatively adjustable parts, including an elongated relatively narrow and relatively thin metallic strip shaped to provide a base 1, an upwardly extended portion 2 integral with one end of said base 1, and a bifurcated upward extension 3 connected with said portion 2 by a part 4. The relatively adjustable cooperating member of said bracket also comprises an elongated relatively narrow and relatively thin metallic strip shaped to form a portion 5 arranged to seat upon the base 1, and an upwardly extended end 6 complementary to and opposite from the extension 3. The overlapping parts 1 and 5 are attached together by clamping devices comprising short bolts 7 extending through an elongated slot 8 in the part 5 and through holes in the base 1, and engaged by nuts 9 which may be screwed on the bolts 7 to clamp the parts 1 and 5 rigidly together, or loosened to permit said parts to be moved relatively to vary the length of the bracket formed thereby.

A cup-like or dished element 10 is attached to the inner side of said upwardly extended end 6 by suitable fastening means, as by a rivet 11. It is evident that said element 10 may be attached to said end 6 otherwise than by said rivet 11. The upward extension 3 at the opposite end of the adjustable bracket described has two laterally spaced arms 12. Said arms 12 are separated by an intervening space 13 which widens toward its upper open end in order to receive and support fishing poles or fishing pole handles of different designs and of different diameters without damaging or marring said poles or pole handles, and without restricting manipulation of "snap" of said poles. For illustration, I have shown a fishing pole 14 of relatively small diameter seated in the lower, that is to say in the narrower, portion of said space 13, while the handle member 15 is at the inner side of said upward extension 3. The handle member 15 is of greater diameter than the width of the space 13, so that said handle member cooperates with said extension 3 to hold the butt or handle end 16 of the fishing pole engaged in the member 10, substantially as shown. The handle member 15 is releasably engaged between the arms 17 of a spring device attached to the bracket part 4 at a short distance from the upward extension 3. The said spring arms 17 grippingly engage and hold the handle member 15 from displacement without causing any damage or injury thereto and without interfering with the free use, manipulation or "snap" of the fishing pole 14. Said spring device comprising the arms 17 hold said pole in a set position in which the butt or handle end 16 of said pole is engaged with the element 10 while the pole proper 14 at the front end of the handle member 15 is seated in the bottom of the space 13, regardless of whether the fishing pole holder is in horizontal position, as shown by solid lines in Fig. 1, or whether said fishing pole holder is tilted upwardly or downwardly, as indicated by dotted lines in Fig. 1. The fasteners 7—9 provide means whereby the fishing pole holder may be adjusted to hold fishing pole handles of different types, sizes and lengths and at different angles of inclination. The upward extension 3 and the upwardly extended end 6 provide a space for containing that offset portion 16' of the handle for supporting the reel 18.

A holding plate or segment 19 is shown as provided with a rebent end 20 rigidly attached to the underside of the base 1 by fasteners 21, or otherwise. The said holding plate or segment 19 projects downwardly and vertically from the base 1 for pivotal attachment to a support. The said holding plate or segment is pivotally connected with a swivel element. In the modification shown, the said swivel element consists of a tube 22 cut or split longitudinally, from one end, and transversely to form a separate semi-tubular tube section 23. That is to say, the tube 22 is cut or split diametrically from its upper end, and transversely at the lower end of said cut or split to form said separate tube section 23, leaving a semi-tubular upper end section 24 complementary to said tube section 23. The holding plate or segment 19 is pivotally and clampingly interposed between the complementary tube sections 23 and 24 by a rivet pivot 25 passing through alined holes in the tube sections 23 and 24 and in said interposed holding plate or segment 19 (Fig. 4). A device is provided for clamping the tube sections 23 and 24 against the holding plate or segment 19 to prevent relative pivotal movements of said tube sections and said holding plate or segment 19. As shown, said clamping device comprises a screw 26 extending diametrically through holes in the tube sections 23 and 24 downwardly beyond the lower edge of the holding plate or segment 19. Said screw 26 has screw-threaded engagement with the tube section 24, and a handle head 27 engaging against the tube section 23 to hold said tube sections clamped against the holding plate or segment 19 and thereby prevent relative pivotal movements or displacement of said parts. Loosening of the screw 26 will release the tube sections 23 and 24 from clamping engagement against the holding plate or segment 19, leaving said parts relatively movable to different adjusted positions one of which is indicated by solid lines, and others of which are indicated by dotted lines in Fig. 1.

A bearing device is attached to the swivel element or tube 22—23—24. In the modification shown, said bearing device comprises a plate disc 28 having a semi-circular slot 29 for receiving the split tube section 24. Said bearing device is secured between the shoulder at the upper end of the tube 22 and the lower end of the split tube section 23 at the union of the tube 22 with the upwardly extended tube section 24. The bearing device is thereby held from longitudinal displacement relative to the tube 22. Said bearing device is of greater diameter than the tube 22 in order to cooperate with a bracket hereinafter disclosed. In the modification shown in Fig. 1, the fishing pole holder includes a ground stake consisting of a rod having an upper end portion 30 arranged to extend into the tube 22 and against the bearing device 28; a laterally extended portion 31 arranged to seat upon the upper surface of the ground when the device is mounted as shown in Fig. 1; and a downwardly projecting lower end 32 arranged to be extended or forced into the ground by pressure applied by placing one foot on the portion 31, or otherwise. When in this adjustment, it is substantially impossible for said ground stake to be displaced by any normal or expected pressure or stress applied to the holder by the fishing pole. The tube 22 can be turned upon and about the stake portion 30 and is supported from downward displacement thereon by the bearing device 28 engaging against the upper end of said stake portion 30. A spring swivel and friction brake is provided to hold the tube 22 on the stake portion 30 yieldingly in any adjustment in which it is placed. Said spring friction brake comprises a bowed spring 33 having a laterally extended end 34 engaged in a hole in the stake part 30, and a hook end 35 engaged in a hole in said stake part 30. This arrangement prevents separation of the spring 34 from the stake 30 when said parts are not enclosed by the tube 22; but leaves the tube 22 rotative on the stake when said parts are enclosed by the tube 22, as shown in Figs. 1 and 4.

In the modification shown in Figs. 12 to 15, in substitution for the ground stake 30—31—32, the invention comprises a bracket device for attaching the holder to a solid support such as to a part of a boat, raft, platform, or rail. The entire device described is used with the exception of the ground stake and the spring friction brake, and like reference numerals are applied to like parts. In this modification, a clamp body is formed of an angular plate section comprising a top 36 and two downwardly extending arms 37 integral with said top. The top 36 is formed with a hole 38 laterally from the arms 37, and a slot 39 extending from said hole 38 between said arms 37. The hole 38 is of larger diameter, while the slot 39 is of less width than, the diametrical width of said bearing device 28, and is of about the same width as the tube formed by the tube sections 23 and 24 (Fig. 13). In assembly, the tube 22—23—24, and the bearing device 28, as passed through the hole 38 and then moved laterally to place the tube 23—24 in the slot 39 and to place the bearing device 28 below the top 36 and between the downwardly extended arms 37. Two locking blocks 40 are attached by welding or otherwise to the adjacent inner sides of the arms 37 near the lower ends of said arms. The locking blocks 40 are formed with notches 41 to receive and hold the lower end of the tube 22. A clamp and a support for said tube 22 comprises a bolt 42 extending through alined holes in the arms 37 below the blocks 40, and a wing nut 43 screwed on said bolt. When the tube 22 is placed in the clamp as above described, the lower end of said tube is engaged in the notches 41 and seats upon the bolt 42. Said blocks 40 and said bolt 42 cooperate to prevent lateral or downward displacement of the tube 22 while the bearing device 28 engaging against the underside of the top 36 prevents upward displacement, or detachment of said tube, from said clamp. The other member of said clamp comprises a jaw 44 slidably mounted on a screw 45 welded or otherwise attached to the top 36 of the clamp body. A wing nut 46 mounted on the screw 45 is manually engageable and operative to hold the clamp jaw 44 against a part 47 which may be considered as representing a part of a boat, raft, platform, or rail with which the stake 30—31—32 could not readily be engaged. When the tube 22 is vertical, as shown in solid lines in Fig. 12, the holder bracket may be adjusted and held in horizontal or any desired inclined position by operation of the clamp screw 26, as before described. In either modification of mounting the invention, the holder may be adjusted as required to engage and hold fishing poles of different types and dimensions.

The bracket device for attaching the holder to a solid support such as to a part of a boat, raft, platform or rail, is designed to afford maximum strength, and also to afford distinct advantages of operation. The arms 37 for engaging one side of said solid support are spaced apart and engage said support along two distinct spaced lines of contact. The jaw 44 is arranged to engage the opposite side of the support 47 midway between the planes of the spaced lines along which the arms 37 engage said support, thereby providing three points of contact for the bracket. The end of the jaw 44 that engages the support 47 is rounded. A metallic insert 44′ is welded or otherwise secured between the two jaw parts 44 to receive pressure when engaged with the support 47 and direct said pressure to the center line of the bushing 45′. This type of bracket and clamp for attaching the fishing pole holder to the support 47 constitutes an important part of the modification shown in Figs. 12 to 15, inclusive.

In one use of my improved fishing pole holder, the butt or handle end 16 is engaged in the member 10, the fishing pole 14 is seated in the space 13, with the handle member 15 between and resiliently engaged by the spring arms 17 and against the bifurcated upward extension 3. The nuts 9 which had been loosened to permit relative longitudinal adjustment of the two bracket members to conform to the length of the handle end of the fishing pole as described, are then tightened to cooperate with the spring arms 17, handle member 15, and upward extension 3 and prevent displacement of the fishing pole. The downwardly projecting lower end 32 of the ground stake is forced into the ground with the laterally extended portion 31 resting on the ground surface, and the lower end of the tube 22 is inserted upon the vertical upper end portion 30 of said ground stake. This leaves the tube 22 rotative about the ground stake while the spring friction brake 33—34—35 prevents unnecessary turning or rattling of the tube 22 on the ground stake, leaving said tube free to be turned by application of suitable force or pull to the fishing pole. The bracket holder upon which the fishing pole is mounted may be adjusted and held in any angle of inclination by the screw 26.

When the ground stake 30—31—32 is not to be used, and when the fishing pole holder is to be attached to a part of a boat, raft, platform, or rail, the tube 22 is extended downwardly through the hole 38 until the bearing device 28 is below the plane of the top 36. The attached upper end portions 23 and 24 of the tube 22 are then moved laterally into the slot 39 to place the bearing device 28 at the underside of said top 36. The lower end portion of the tube 22 is then engaged in the notches 41 and upon the bolt 42. After the parts have been assembled in this manner, the nut 43 is tightened sufficiently to hold said parts in said position. Either before or after the parts have been assembled in this position, the bracket of the fishing pole holder may be adjusted and held in any desired angular position by manipulation of the clamping device 26—27, as described.

It is now evident that my improved fishing pole holder attains all of its intended advantages, conveniences and objects in a most desirable manner. In the particulars defined, the fishing pole holder is of flexible, universal, compact and practical construction, and may be conveniently and satisfactorily used for holding fishing poles of different types and forms. The construction and arrangement of the parts may be varied within the scope of equivalent limits without departure from the nature and principle of the invention as defined by the appended claims.

I claim:

1. A fishing pole holder comprising an elongated bracket, elements at the ends of said bracket for engaging and holding the handle of a fishing pole, a spring device attached to said bracket for engaging and preventing displacement of said fishing pole handle from said elements, a holding plate attached to and extending downwardly from said bracket, a tube pivotally connected with said holding plate, a releasable clamping device for holding said tube and said holding plate relatively immovable, a bearing device supported by said tube, and a ground stake adapted to be extended into said tube into engagement with said bearing device and thereby pivotally support said bracket for turning movements about the axis of said tube.

2. A fishing pole holder comprising an elongated bracket, elements at the ends of said bracket for engaging and holding the handle of a fishing pole, a spring device attached to said bracket for engaging and preventing displacement of said fishing pole handle from said elements, a holding plate attached to and extending downwardly from said bracket, a tube pivotally connected with said holding plate, a releasable clamping device for holding said tube and said holding plate relatively immovable, a bearing device supported by said tube, a ground stake adapted to be extended into said tube into engagement with said bearing device and thereby pivotally support said bracket for turning movements about the axis of said tube, and a spring brake member interposed between said ground stake and said tube.

3. A fishing pole holder comprising an elongated bracket, elements on said bracket for engaging and holding the handle of a fishing pole, a downwardly extended holding plate attached to said bracket, a tube pivotally connected with said holding plate, a device for clamping said tube and said holding plate together to prevent relative movement thereof, a bearing device attached to said tube, and a bracket engaged by said tube and said bearing device for engaging a stationary support.

4. A fishing pole holder comprising two elongated metallic strips, elements on said respective strips for engaging and holding a fishing pole handle, clamps for holding said strips in different adjusted positions according to the length dimensions of the fishing pole handles to be held thereby, a tube, means pivotally connecting the tube with one of said strips, a releasable clamp device for preventing relative movement of said tube and said strips, a bracket, means for holding said tube in pivotal connection with said bracket, and means for clamping said bracket onto a support.

HOWARD C. KAETKER.

REFERENCES CITED

The following references are of record in the file of this patent:

UNITED STATES PATENTS

| Number | Name | Date |
|---|---|---|
| 420,592 | Dayton | Feb. 4, 1880 |
| 1,035,739 | Raes | Aug. 13, 1912 |
| 2,204,692 | Parisio | June 18, 1940 |
| 2,236,070 | Rohrdanz | Mar. 25, 1941 |
| 2,265,330 | Waddle et al. | Dec. 9, 1941 |
| 2,314,747 | White | Mar. 23, 1943 |